(12) United States Patent
Reynolds

(10) Patent No.: US 8,782,746 B2
(45) Date of Patent: Jul. 15, 2014

(54) SYSTEM AND METHOD FOR SUPPORTING MULTIPLE IDENTITIES FOR A SECURE IDENTITY DEVICE

(75) Inventor: Steven J Reynolds, Littleton, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 1216 days.

(21) Appl. No.: 12/267,838

(22) Filed: Nov. 10, 2008

(65) Prior Publication Data
US 2010/0100940 A1 Apr. 22, 2010

Related U.S. Application Data

(60) Provisional application No. 61/106,338, filed on Oct. 17, 2008.

(51) Int. Cl.
  H04L 29/06 (2006.01)
  H04L 29/12 (2006.01)
(52) U.S. Cl.
  CPC .............. *H04L 63/08* (2013.01); *H04L 61/00* (2013.01)
  USPC .................................. 726/4; 726/6; 709/245
(58) Field of Classification Search
  CPC ................................ H04L 63/08; H04L 61/00
  USPC .......................................... 726/4, 6; 709/245
  See application file for complete search history.

(56) References Cited

U.S. PATENT DOCUMENTS

| | | | |
|---|---|---|---|
| 4,558,464 A | 12/1985 | O'Brien, Jr. | |
| 4,613,901 A | 9/1986 | Gilhousen et al. | |
| 5,781,226 A | 7/1998 | Sheehan | |
| 5,784,095 A | 7/1998 | Robbins et al. | |
| 5,787,172 A | 7/1998 | Arnold | |
| 5,854,901 A | 12/1998 | Cole et al. | |
| 6,148,400 A | 11/2000 | Arnold | |
| 6,456,716 B1 | 9/2002 | Arnold | |
| 7,852,878 B2 * | 12/2010 | Jang et al. ..................... | 370/475 |
| 2002/0131446 A1 * | 9/2002 | Metcalf, III .................. | 370/465 |
| 2003/0014762 A1 * | 1/2003 | Conover et al. ............... | 725/110 |
| 2003/0174684 A1 * | 9/2003 | Pohjanvuori et al. ......... | 370/338 |
| 2004/0193725 A1 * | 9/2004 | Costa-Requena et al. .... | 709/238 |

(Continued)

FOREIGN PATENT DOCUMENTS

| WO | 03104922 A2 | 12/2003 |
|---|---|---|
| WO | 2008028835 A2 | 3/2008 |

OTHER PUBLICATIONS

European Search Report for Application No. 09172681.0, dated Jul. 27, 2011.

*Primary Examiner* — Michael Pyzocha
(74) *Attorney, Agent, or Firm* — Banner & Witcoff, Ltd.

(57) ABSTRACT

A multiple-identity secure device (MISD) persistently stores a single identification code (a "seed identity"). The seed identity need not be a network address, and may be stored in an integral memory of the device, or on an interchangeable card received in a physical interface of the MISD. The MISD is provided with a transformation engine, in hardware or software form, that is subsequently used to generate one or more unique identities (e.g., network addresses) from the stored seed identity using predefined logic. The generated identities may be dynamically generated, e.g., in real-time as needed after deployment of a device into possession of a subscriber/customer/user, etc., or may be securely stored in the MISD for subsequent retrieval. The transformation engine may generate a unique identity in accordance with an addressing scheme identified as a default setting, a global/network setting, or as determined from a received data transmission.

28 Claims, 4 Drawing Sheets

(56) References Cited

U.S. PATENT DOCUMENTS

| | | |
|---|---|---|
| 2005/0086528 A1 | 4/2005 | Darziv et al. |
| 2005/0144020 A1* | 6/2005 | Muzaffar et al. ............... 705/1 |
| 2006/0039378 A1* | 2/2006 | Medina et al. ............... 370/392 |
| 2007/0180484 A1* | 8/2007 | Siripunkaw et al. .......... 725/111 |
| 2007/0248114 A1* | 10/2007 | Jia et al. ....................... 370/465 |
| 2008/0031278 A1* | 2/2008 | Jang et al. .................... 370/475 |
| 2008/0104243 A1 | 5/2008 | Roscoe et al. |
| 2008/0281966 A1* | 11/2008 | Jennings et al. .............. 709/225 |

\* cited by examiner

SYSTEM AND METHOD FOR SUPPORTING MULTIPLE IDENTITIES FOR A SECURE IDENTITY DEVICE

CROSS-REFERENCE TO RELATED APPLICATION

This application is based on and claims priority to U.S. Provisional Application No. 61/106,338, filed Oct. 17, 2008, the entire disclosure of which is hereby incorporated herein by reference.

FIELD OF THE INVENTION

The present invention relates generally to secure communications between devices in an information network. More particularly, the present invention relates to a system and method for supporting multiple identities for a secure identity device by dynamic generation of device identities from a persistently-stored seed identity.

DISCUSSION OF THE RELATED ART

An "information network" refers to a collection of elements or devices, collectively "devices", having a transport mechanism for exchanging information or content between the devices. Such networks may have any suitable architecture, including, for example, client-server architecture, 3-tier architecture, N-tier architecture, distributed objects, loose coupling, or tight coupling.

One example of an information network is a subscriber-based cable or satellite system, such as the exemplary system shown in FIG. 1. This exemplary information network is typical of many different types of information networks in that it involves data transmissions between devices in the network, and that it is often advantageous or necessary that a particular device be uniquely identifiable and/or addressable on the network, and/or that transmissions be made in a secure manner with specific devices.

By way of further example, with reference to FIG. 1, the exemplary subscriber-based television system, that propagates content (e.g., entertainment and commercials information such as movies, sports, television programming and the like), information (e.g., video on demand, Interactive Program Guide (IPG) services and the like) and applications (e.g., billing and other services) to client devices or set top boxes associated with subscribers/users.

"Set top box" or STB refers to a device that connects to a monitor and an external source of signal, converting the signal into content for display/transmission over the monitor. The signal source might be an Ethernet cable, a satellite dish, a coaxial cable, a fiber optic cable, a telephone line (including DSL connections), Broadband over Power Line, or even an ordinary antenna. The STB may have several different embodiments. For example, it may be a special digital STB for delivering digital content on TV sets that do not have a built in digital tuner. The STB may also descramble premium channels. An STB may be a cable converter box to receive digital cable TV channels and convert them to analog for non-digital TVs. In the case of direct broadcast satellite (mini-dish) systems such as SES Astra, Dish Network, or DirecTV, the STB is an integrated receiver/decoder (or IRD). In internet packet (IP) TV networks, the STB is a small computer providing two-way transmissions on an IP network, and decoding the video streaming media which eliminates the need for any coaxial cabling. The STB may be a discrete unit or its functionality may be incorporated into other components of the user's system such as the monitor, TV, DVR, residential gateway, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television (or DVR).

A "digital video recorder" (DVR) refers to a device or system that records video in a digital format to a digital storage medium such as a disk drive or solid state memory for future playback. DVRs have different configurations. For example, a DVR may be a stand-alone, modular unit (such as those sold by TiVo), it may be a portable personal device, or it may be incorporated into other audiovisual components such as a set-top box or the TV itself. It may even be software for a personal computer (PC) that enables the PC to capture video for playback using the digital storage medium of the PC.

The system of FIG. 1 transmits various data signals constituting various content, which signals may be scrambled, encrypted or otherwise secured, to the different STBs 142 in the system. Operation and interconnection of the similar devices in a similar system are described in detail in U.S. Pat. No. 5,787,172, the entire disclosure of which is hereby incorporated herein by reference. The term "transmitted" or "transmits" refers broadly to sending a signal from a transmitting device to a receiving device. The signal may be transmitted wirelessly or over a solid medium such as wire or fiber.

The exemplary system 100 of FIG. 1 comprises a head-end 120, a network 130 and a plurality of set-top boxes STBs $140_1$ through $140_N$ (collectively STBs 140), as is typical of such systems. The head-end 120 typically also comprises an application server 122 and operates in part to transmit information to, and receive information from, the STBs 140 via network 130. The head-end 120 also comprises a server 110 which receives data from a data provider 106 through a network 107 such as, for example, the Internet. The server 110 may be accessed using an operator GUI 112 for adding and monitoring data.

The head-end 120 is associated with a neighborhood of STBs $140_{1-N}$. The head-end 120 communicates with the STBs 140 within its neighborhood via a downstream transmissions channel (DOWN) and an upstream transmissions channel (UP). These channels are supported by a network topology 130, such as a hybrid fiber-coax cable television distribution system, a satellite distribution system (e.g., using a telephone network or reverse satellite link for upstream transmissions) and the like.

The head-end 120 interacts with the STBs 140 to enable the delivery of content, etc. provided by the server, as well as to return STB messages, etc. to the server 120. Each STB is typically associated with a respective display device 150, such as a television or other video display device, and a user input device 160 such as a remote control, etc.

The STBs 140 operate to receive signal transmissions from the head-ends 120 via the network 130 using the downstream transmissions channel DOWN (or an out-of-band channel). The transmissions may be broadcast, multicast/narrowcast, or unicast. Broadcasting refers to the transmission of content to an audience at large. The audience may be the general public, or a sub-audience. Switched digital video is a type of broadcast that is initiated in response to a client request and is terminated when no more clients are tuned to it. Multicasting refers to the simultaneous transmission of content to a plurality of specific and known destinations or addresses in a network or between networks. Multicast is often used for streaming media and Internet television applications, Ethernet multicast addressing, ATM point-to-multipoint VCs and Infiniband multicast. Unicasting refers to the transmission of a signal to a single destination or address in a network. Unicast is used, for example, in Video-On-Demand applications.

To enable such transmissions to the STBs, it is important that each STB is uniquely identifiable within the network. By way of example, the identity of a device must be reliably determinable and authenticatable to preserve the integrity of the information network, e.g. to validate data intended for receipt by a specific device in a data distribution system, prevent digital piracy, theft of content, or unauthorized access to content in a digital data distribution system. Systems and methods of such validation are well-known in the art and thus are not described in detail herein.

To ensure that each STB is uniquely identifiable, each STB is assigned a unique network address that permits the head-end to communicate with the STB to, for example, establish in the STB an authorization code that determines which pay programs that STB will be able to receive. In many systems, the STB is also able to communicate with the head-end in a two-way transmission link, so as to permit each STB to be interrogated or addressed from the head-end. Such two-way transmission also requires that each STB be assigned a unique network address.

In order to ensure the uniqueness and authenticity of the devices, it is common practice to encode each device's network address (e.g. in bits) in a memory of the device at a time of manufacture of the device or one of its components. The address/memory is secured, in part, by rendering the associated memory location read-only after initial programming. Furthermore, the address value itself is typically made available to application level software via a secure API to prevent "hacking" or "spoofing" of the identity. By way of example, the STB address is conventionally stored in ROM or one-time-programming (OTP) memory during manufacture of the device. Alternatively, the address may be stored in a programmable read-only-memory (PROM) at or prior to the time the STB is installed at a subscriber's home. This is done in the field by a professional installer, using a PROM programmer. The installer typically programs the PROM with the preassigned address for that STB and installs the PROM into a socket provided for the PROM in the subscriber's STB.

These procedures are typically time-consuming, costly and inefficient, and must be repeated in the field each time a new STB is installed at a subscriber's home.

Further, as information networks have evolved, it has become apparent that there is sometimes a need for a single device, such as a wireless telephone/PDA handset or DVB-Simulcrypt-capable device, to present one of several different identities over its lifetime. Typically, this is done by configuring the device with a physical interface configured to accept a secure identity card, such as a SIM module or SmartCard, and allowing exchange of the identity by physically replacing one secure identity card with another. However, the configuration of devices with such physical interfaces has been found to be undesirable as they provide an interface that can be used by pirates, hackers, etc. to gain unauthorized access to secure information networks.

Further still, there is sometimes a need for a single device to present, essentially concurrently, several different identities, e.g. to support a conditional access system in which different permissions, rights, entitlement, content, etc. are provided according to a profile for each identity. In circumstances in which an interchangeable card is not intended to be employed, a single device may be initially programmed to include multiple unique identities. However, programming multiple, unique identities is disadvantageous in that it requires incrementally more space in the secure memory area of the device. This space is often limited and adding space is expensive, as it often requires new revisions of the device or system-on-a-chip elements of the device.

What is needed is a system and method that addresses the disadvantages of physical interface and multiple identity programming discussed above, and that is capable of providing multiple identities in the event that a physical interface will not be included in a device, and in the event that the intended identity needed for deployment is not yet known at time of manufacture.

SUMMARY OF THE INVENTION

The present invention provides a multiple-identity secure device having a single persistently-stored identification code (a "seed identity"), and a transformation engine that is subsequently used to generate one or more unique identities (e.g., network addresses) for the device from the stored seed identity. The seed identity is an identification code, which may be unique, may be a network address, and may be a code other than a network address, such as a serial number or other identification code. The transformation engine includes computer-readable instructions executable by a microprocessor to receive the seed identity as input, and to generate as output at least one unique identity as a function of predefined logic. The transformation engine may receive input identifying and addressing scheme, and may be configured to correspondingly generate unique identity that is compliant with the identified addressing scheme. The predefined logic may include conditional logic requiring generation of a unique identity by a first method for a first condition and by a second method for a second condition.

BRIEF DESCRIPTION OF THE DRAWINGS

The present invention will now be described by way of example with reference to the following drawings in which.

DETAILED DESCRIPTION

Figure 1:
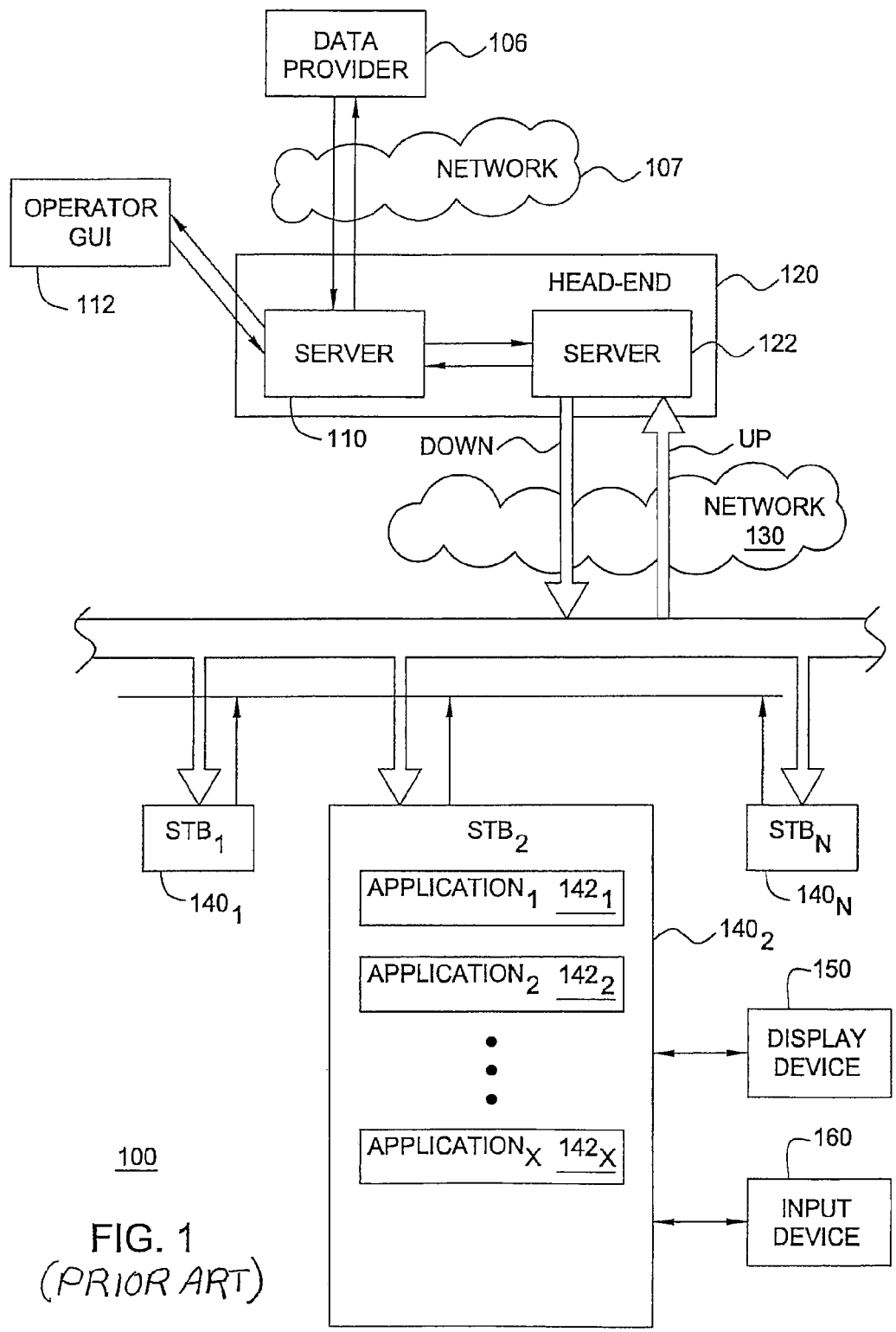
FIG. 1 is a block diagram of an exemplary prior art information network into which multiple-identity secure devices in accordance with the present invention may be deployed.

In contrast to conventional secure identity devices, each of which stores a single network address for use to direct data transmissions to each specific device, the present invention provides a multiple-identity secure device having a single persistently-stored identification code (a "seed identity"), and a transformation engine that is subsequently used to generate, in an automated fashion, one or more unique identities (e.g., network addresses) for the device from the stored seed identity.

The seed identity is an identification code. In one embodiment, the seed identity is unique among identification devices within a network. Unlike conventional storage of network addresses, the seed identity stored in accordance with the present invention may be something other than a network address. Further, it is accessed by a transformation engine, and may be securely stored. Although the seed identity may be a network address, it may also be another code completely unrelated to a network address, such as a serial number or other alphanumeric string. By way of example, the seed identity may comprise a simple numeric sequence, such as a 32-bit number, or it may be more sophisticated, such as a MAC address.

The transformation engine generates identities as a function of the seed identity, using predefined logic. The generated identities may be dynamically generated, e.g., in realtime as needed, after deployment of a device into the field, e.g., into the possession of a subscriber/customer/user. The transformation engine includes computer-readable instructions executable by a microprocessor to receive the seed identity as input, and to generate as output at least one unique identity as a function of predefined logic accessible to the transformation engine 220. The transformation engine may be implemented as firmware in hardware or as software stored in memory. The predefined logic may be incorporated into the transformation engine, e.g., hard-coded into the transformation engine software, and may include any suitable logic for generating a unique identity, e.g., unique network address, from the seed identity. By way of example, the predefined logic may require generation of a unique identity by adding an offset, bit mask, or bit shift to the seed identity. By way of further example, the predefined logic may include conditional logic requiring generation of a unique identity by a first method for a first specified addressing scheme, and by a second method for a second specified addressing scheme.

Thus, the present invention provides a system and method that addresses the drawbacks of physical interface and multiple identity programming discussed above, and yet is capable of providing and supporting multiple identities in the event that a physical interface will not be included in a device and that the intended identity needed for deployment is not yet known at time of manufacture.

Although the prior art discussion above relates to a subscriber-based television system, one of skill in the art will understand that the present disclosure is applicable to a wide variety of information networks that require each device to have a secure identity. For example, the present invention can be employed in a subscriber radio system, a wireless voice or data network. Examples of secure identity devices include an STB in a cable or satellite television system, a wireless telephone handset or personal digital assistant (PDA) devices in a telecommunications network, a portable media player storing protected content, or a removable storage device for securely storing PC data, such as a secure RAM card.

In addition, one of skill in the art will understand that the present disclosure is applicable to other systems for which communication is not the primary purpose. For example, the present invention can also be applied in an alarm system network involving transmission between different elements of the system. The present invention should not be construed to limit the scope of the invention to an "information network," where the primary objective of the system is to transmit information. The present invention can apply to systems in which the transmission of information is only a minor, or even insignificant, aspect of the overall system. In fact, the present invention can be adapted for use in any system involving secure identity devices.

As used herein, an identity, memory, etc. is considered "secure" if an encryption/decryption system is used for which determination of encrypted information is computationally or economically infeasible without knowledge of specific decryption information and where the decryption information has not been acquired by outsiders, or if a signature/verification system is used for which unauthorized insertion or modification of signed information is computationally or economically infeasible without knowledge of specific signature information and where the signature information has not been acquired by outsiders, or if data is otherwise protected by security measures. In one embodiment, an encryption/decryption system is used for which determination of encrypted information is computationally infeasible without knowledge of specific decryption information, and a signature/verification system is used for which unauthorized insertion or modification of signed information is computationally infeasible without knowledge of specific signature information.

Figure 2:
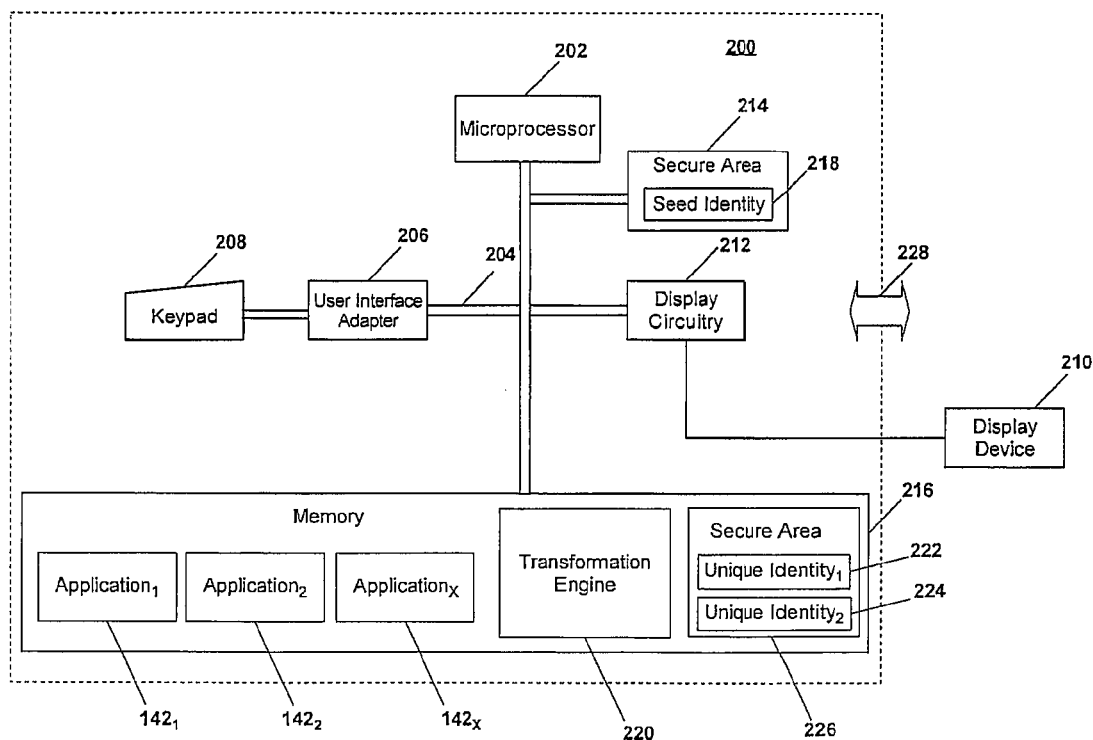
FIG. 2 is a block diagram of an exemplary multiple-identity secure device in accordance with the present invention.

FIG. 2 is a high level block diagram of an exemplary multiple-identity secure device (MISD) 200. Each MISD includes conventional hardware and software typical of commercially-available secure identity devices, which may include a variety of client devices and/or network devices.

The exemplary MISD be a specially-configured set top box (STB) for use in the exemplary network of FIG. 1, in accordance with the present invention. Alternatively, the MISD may be configured as a wireless telephone handset, a smartphone, a PDA, a portable media player, a removable storage device, or another device. The discussion below discusses the MISD 200 in the context of an STB for illustrative purposes only.

Referring now to FIG. 2, the MISD 200 includes a microprocessor 202 and a bus 204 employed to connect and enable communication between the microprocessor 202 and the components of the MISD in accordance with known techniques. The MISD typically includes at least a user interface adapter 206, which connects the microprocessor 202 via the bus 204 to one or more interface devices, such as a keypad 208. The bus 204 also connects a display device 210, such as an external television, LCD screen or monitor, to the microprocessor 202 via a display adapter 212. The bus 204 also connects the microprocessor 202 to non-volatile memory 216, which can include a hard drive, diskette drive, tape drive, random access memory (RAM), etc.

In accordance with the present invention, the MISD stores a seed identity 218 in memory. In this example, the MISD stores the seed identity 218 in a read-only memory (ROM) 214 operatively connected to the microprocessor 202. The term ROM is intended herein to be read in a broad, and not limiting, fashion, and includes conventional ROM, PROM and one-time programmable (OTP) memory. For example, the MISD may store the seed identity in a secure storage area of the device. The inclusion of such secure storage areas in such chips and devices, and storing data in such secure storage areas, are well known in the art. In accordance with conventional manufacturing techniques, the ROM is written to at the time of manufactures. In accordance with the present invention, a seed identity is assigned and stored in the ROM at the time of manufacture. The seed identity may be stored in the ROM in a conventional fashion.

In one embodiment, each MISD is provided with a unique seed identity, so that no two devices are assigned the same seed identity. In such an embodiment, a single predefined logic may be used to generate unique identities from each respective seed identity.

Alternatively, some secure identity secure cards, and thus some devices, may be provided with identical seed identities. In such a case, different predefined logic may be used by the transformation engine to generate different unique identities for the devices from the same seed identity.

As discussed above, the MISD further includes a non-volatile storage memory operatively 216 connected to the microprocessor 202. The MISD may store various microprocessor-executable software applications. For example, in the context of an STB, the MISD may store application programs 142₁-142ₓ (application programs 142), which may include any of the applications used within the context of an STB 140, such as an interactive program guide (IPG) application, a VOD selection/billing application and the like.

In accordance with the present invention, the MISD further includes a transformation engine 220. The transformation engine 220 includes computer-readable instructions executable by the microprocessor 202 to receive the seed identity 218 as input, and to generate as output at least one unique identity 222, 224 as a function of predefined logic accessible to the transformation engine 220. The unique identity 222, 224 is a code uniquely identifying the MISD, such as a network address.

In this exemplary embodiment, the transformation engine 220 is implemented as computer software stored in the memory 216. Alternatively, the transformation engine 220 may be implemented as firmware in hardware. In one embodiment, the software program is stored and/or executed in secure code space 226 within the device, such secure code space being well known in the art. The predefined logic may be incorporated into the transformation engine, e.g., hard-coded into the transformation engine software.

The predefined logic may include any suitable logic for generating a unique identity, e.g., unique network address, from the seed identity. By way of example, the predefined logic and seed identities are selected such that all generated identities across all devices deployed for use within a network are unique identities. By way of example, the predefined logic may require generation of a unique identity by adding an offset, e.g., 0x8000, to the seed identity. Alternatively, by way of example, the predefined logic may require generation of a unique identity by applying a predetermined bit mask or bit shift to the seed identity.

By way of further example, the predefined logic may include conditional logic requiring generation of a unique identity by a first method for a first specified addressing scheme, and by a second method for a second specified addressing scheme. For example, such conditional logic may require generation of a unique identity by adding a first offset (e.g., 0x8000) if a first addressing scheme is received as input, and a second offset (e.g., 0x4000) if a second addressing scheme is received as input. It will be appreciated that the fundamental methodologies for generating a unique identity may be entirely different for each addressing scheme (e.g., requiring applying an offset for a first addressing scheme and requiring applying a bit mask for a second addressing scheme).

In one embodiment, the transformation engine 220 is capable of receiving further input representing a desired addressing scheme with which the generated unique identity must comply. For example, this input may designate a specific addressing scheme and the transformation engine may be capable of generating a single identity in each scheme from the seed identity. In a preferred embodiment, the transformation engine 220 is configured to be capable of generating a plurality of unique identities in at least one addressing scheme from the seed identity. By way of example, the specified addressing scheme may be a conditional access scheme, such as Digicipher, PowerKEY, or Nagra Aladdin, or a more general addressing scheme, such as a MAC address.

In other embodiments of the MISD, such as a wireless telephone handset, smartphone, PDA, personal computer, etc., the MISD may further include a mouse, keyboard and/or other interface devices, such as a touch sensitive screen, digitized entry pad, etc., connected to the user interface adapter, and may further include an integral display device. It will be understood by those skilled in the art that the MISD may further include various other components, such as an operating system stored in the memory, various conventional circuitry, various I/O ports and devices, etc., which are well-known in the art. Further, although the MISD is generally depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

Optionally, the ROM may be part of a secure identity card that is interchangeably connectable to a network device via a suitable physical interface, such as a conventional I/O port. By way of example, a discrete secure identity card may be one of a CableCARD, a PCMCIA card, a SIM card and a Smart Card. In such an embodiment, the MISD includes a data communication physical interface port capable of interchangeably receiving the cards. In a preferred embodiment, the ROM is an integral part of the MISD and is not configured to be interchangeable. It will be appreciated that the secure identity card may be manufactured to include the seed identity apart from any manufacture of the MISD, or alternatively, may be manufactured to include the seed identity as part of the MISD device itself. Further, it will be appreciated that the device may be provided with the transformation engine and predefined logic during manufacture of the device, or after manufacture and deployment of the device within a network. The device and/or secure identity cards may be distributed to end users/consumers and deployed within a network in any suitable manner.

In the context of FIG. 1, the MISDs could be deployed as STBs connected via an information network to, in this example, a head-end of a cable television network. Each of the MISDs is configured to receive data transmissions via the network. The head-end includes, as is conventional, a plurality of content sources and prepares digital data transmissions directed to specific receiving devices, e.g. STBs. The digital data transmissions are directed to a specific receiving device in that it is prepared include recipient identity data corresponding to the intended recipient device's unique identity, e.g., network address of a specific receiving device. Methods and systems for addressing digital data transmissions intended for specific receiving devices are well-known in the art.

Figure 3:
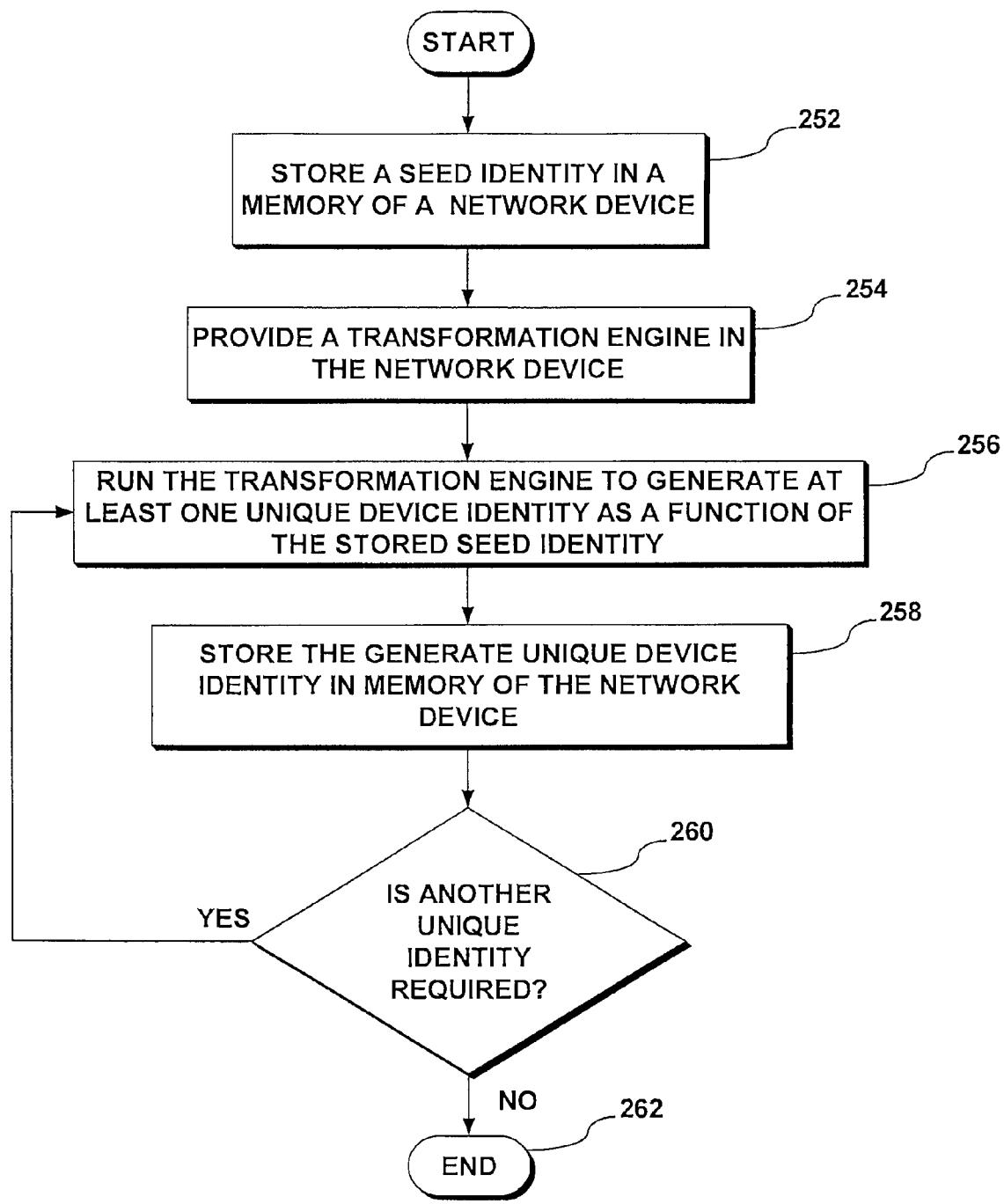
FIG. 3 is a flow diagram of an exemplary method for supporting multiple identities for a secure identity device in accordance with the present invention.

FIG. 3 is a flow diagram illustrating an exemplary method 250 for supporting multiple identities for a secure identity device. Referring now to FIG. 3, the method involves preparing an MISD, which includes storing a seed identity in a secure memory, such as ROM, of an MISD, as shown at step 252 of FIG. 3. For example, this may involve manufacture of an STB, a wireless telephone, a PDA, a computer, etc. in a substantially conventional manner, but to include the seed identity. Alternatively, this may involve manufacture of a secure identity card in a substantially conventional manner, but to include a seed identity, and later operatively installing the secure identity card in a physical interface of the MISD.

The method further includes providing a transformation engine in the MISD, as shown at step 254. For example, this may be performed during manufacture of the device by storing a computer program in the non-volatile storage memory of the device. Alternatively, this may be performed post-manufacture by copying software to the device, or by post-installation downloading of software to the device via a network.

After the MISD has been provided, the transformation engine is run, e.g. the software is executed, to generate a unique device identity as a function of the stored seed identity, as shown at step 256. By way of example, this may be performed responsive to power-up of the MISD, responsive to connection of the MISD to a network, responsive to receipt of a command via a keypad, etc. of the MISD, responsive to receipt of a command via the network, or responsive to receipt of a data transmission via the network, as part of a verification process to ensure that the data transmission is intended for the device, etc.

In this exemplary embodiment, the generated device identity is stored in secure memory of the device, e.g., in RAM, for subsequent use, as shown at step 258. In an alternative embodiment, the generated identity may not be stored for subsequent retrieval, but rather may be generated for immediate use and then deleted.

In this exemplary embodiment, it is next determined if another identity is required, based on an applicable security model and/or addressing scheme that is determined to be used within an information network. This determination may be signaled to the MISD by the network, for example, in an MPEG CAT (Conditional Access Table). If not, then the method ends, as shown at steps 260 and 262. If so, the transformation engine 220 may be rerun to generate a unique identity, as shown at steps 260 and 256. It should be noted that in certain instances, that engine may be run and rerun to repeatedly generate a certain single unique identity, e.g. upon receipt of each transmission, for verification purposes. Alternatively, the engine may be rerun to generate multiple different identities, which may be used concurrently, or successively. Alternatively, the engine may be rerun to generate a new identity in response to a command via the network, e.g. to implement a new identity-generation logic, to create a new identity in the event of discontinuance of service, to create a new identity in the event of changes in the network, to create a new identity in the event of unauthorized access, for example.

Figure 4:
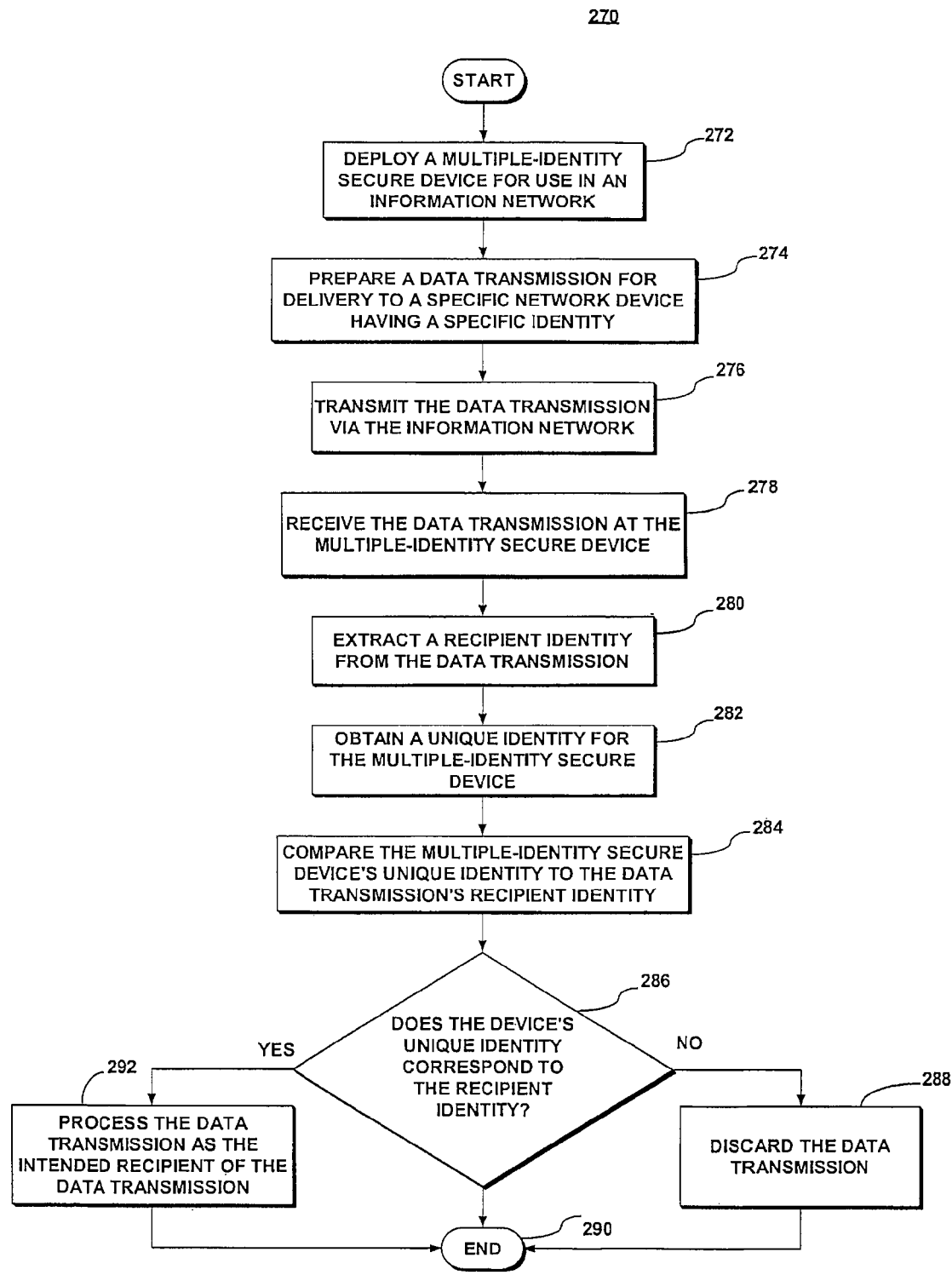
FIG. 4 is a flow diagram of an exemplary method for processing data using a multiple-identity secure device in accordance with the present invention.

FIG. 4 is a flow diagram of an exemplary method 270 for processing data using an MISD in accordance with the present invention. Referring now to FIG. 4, the method begins with deploying an MISD for use in the network, as shown at step 272 in FIG. 4. For example, this may involve distributing the MISD, connecting the MISD to the network, configuring the MISD for use in the network, etc.

Next, the method involves preparing a data transmission for secure delivery to a specific network device having a specific identity, as shown at step 274 in FIG. 4. Exemplary data transmissions include a packetized Entitlement Management Message, in the context of MPEG, and may relate to transmissions of voice, video and/or data content. Methods and technology for doing so are well-known in the art and therefore not described in detail herein. Next, the method involves transmitting data to one or more network devices via an information network, as shown at step 276. For example, this may be performed by the head-end in a subscriber television network, or by a wireless voice/data carrier in a wireless voice/data network, or by a digital content provider in a digital information network. It should be noted that a data transmission can be addressed to a particular MISD when the MISD's seed identity and the transformation logic are known to the head-end, etc. of the network, because the MISD's unique ID will be/has been generated in a predictable manner known to the head-end, etc.

Next, the MISD receives the transmitted data, as shown at step 278. Further, the MISD extracts recipient identity data from the transmitted data, as shown at step 280. This may be performed by application software stored in the memory 216 of the MISD 200 and executable by the microprocessor 202. Examples of such application software include message stream processors, conditional access kernels, and set-top client middleware, and are well-known in the art.

In certain embodiments, the application software examines the recipient identity data and determines which of several known addressing schemes are being used to direct the data transmission to the recipient. In such embodiments, the application software provides an indication of the application addressing scheme as input to the transformation engine, and the transformation engine generates a unique identity compliant with the identified addressing scheme.

The MISD then obtains a generated identity, generated by the transformation engine from the seed identity, as shown at step 282. In one embodiment, this involves referencing a secure storage area 216 of the MISD and retrieving an identity 222 previously-generated by the transformation engine 220. In a preferred embodiment, this involves causing the transformation engine 220 to run to generate a unique identity in response to receipt of a data transmission at the MISD.

In embodiments in which the MISD determines the addressing scheme used by the data transmission, the MISD retrieves an identity conforming to that addressing scheme from the memory of the MISD, or alternatively, provides the identity of that addressing scheme as an input to the transformation engine for use to generate an identity compliant with that addressing scheme.

The MISD then compares the generated identity to the recipient identity data to determine whether they correspond. For example, correspondence may be found when there is an exact match of all or a portion of the recipient identity data to the generated unique identity, as known in the art. In this manner, each MISD may determine whether the received data transmission is intended for that particular MISD, as shown at steps 282 and 284. This may be performed by the application software, as is conventional in secure identity systems.

If it is determined at step 286 that the generated identity does not correspond to the recipient identity data specified by the data transmission, then the received data transmission was not intended for use by that particular MISD, and the received data transmission is discarded, e.g., deleted or ignored, and the method ends, as shown at steps 288 and 290.

If it is determined at step 286 that the generated identity does correspond to the recipient identity data specified by the data transmission, then the received data transmission was intended for use by that particular MISD, and the MISD processes the received data transmission in a conventional manner and the method ends, as shown at steps 290 and 292. For example, such processing may include parsing the message to extract specific command and control parameters for a client device, such as instructions to activate or deactivate the device, to reinitialize the device, or to cause a message to be displayed via a display device, such as a television, CRT, LCD or other display screen associated with the MISD.

The invention may be implemented by a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions. Thus, the present invention also provides computer readable media storing computer readable code for carrying out the method steps identified above. The computer readable media stores code for carrying out subprocesses for carrying out the methods described above.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. One or more non-transitory computer-readable medium storing computer-readable instructions that, when executed by a processor, cause the processor to:
   receive a data transmission comprising recipient identity data;
   determine an addressing scheme used to direct the data transmission;
   retrieve a seed identity comprising an identification code;
   generate a unique identity based on the seed identity and the determined addressing scheme;
   extract the recipient identity data from the received data transmission; and
   determine whether the generated unique identity corresponds to the recipient identity data.

2. The one or more non-transitory computer-readable medium of claim 1, storing additional computer-readable instructions that, when executed by the processor, cause the processor to:
   if the generated unique identity does not correspond to the recipient identity data, discard the data transmission; and
   if the generated unique identity corresponds to the recipient identity data, use data from the data transmission.

3. The one or more non-transitory computer-readable medium of claim 1, wherein
   generating the unique identity comprises generating the unique identity in compliance with the determined addressing scheme.

4. A device comprising:
   a microprocessor; and
   memory storing computer-readable instructions that, when executed by the microprocessor, cause the device to:
   receive a data transmission comprising recipient identity data;
   determine an addressing scheme used to direct the data transmission;
   retrieve a seed identity comprising an identification code;
   generate a unique identity based on the seed identity and the determined addressing scheme;
   extract the recipient identity data from the received data transmission; and
   determine whether the generated unique identity corresponds to the recipient identity data.

5. The device of claim 4, wherein the memory comprises:
   a read-only memory (ROM) operatively connected to the microprocessor, the ROM configured to securely store the seed identity; and
   a non-volatile storage memory operatively connected to the microprocessor, the non-volatile storage memory storing a transformation engine configured to generate the unique identity.

6. The device of claim 4, further comprising:
   a data communication port configured to receive a secure identity card,
   wherein the secure identity card is configured to store the seed identity.

7. The device of claim 6, wherein the secure identity card comprises one of a CableCARD, a PCMCIA card, a SIM card, and a Smart Card.

8. The device of claim 5, wherein the ROM comprises one of a programmable read only memory (PROM) and a one-time-programmable (OTP) memory.

9. The device of claim 4, wherein the memory stores additional computer-readable instructions that, when executed by the microprocessor, cause the device to:
   if the recipient identity data does not correspond to the generated unique identity, discard the data transmission; and
   if the recipient identity data corresponds to the generated unique identity, use data from the data transmission.

10. The device of claim 4, wherein the memory stores additional computer-readable instructions that, when executed by the microprocessor, cause the device to:
    store the unique identity in non-volatile storage memory;
    receive a second data transmission directed using the addressing scheme; and
    retrieve, from the non-volatile storage memory, the stored unique identity based on a determination that the stored unique identity is compliant with the addressing scheme.

11. The device of claim 4, wherein generating the unique identity is performed in response to receiving the data transmission.

12. The device of claim 4, wherein the memory stores additional computer-readable instructions that, when executed by the microprocessor, cause the device to:
    provide, to a transformation engine, information identifying the addressing scheme, wherein generating the unique identity comprises generating the unique identity in compliance with the addressing scheme.

13. The device of claim 4, wherein the memory stores additional computer-readable instructions that, when executed by the microprocessor, cause the device to:
    store the unique identity in a secure area of the memory.

14. The device of claim 4, wherein the memory stores a plurality of unique identities, and wherein the plurality of unique identities includes the unique identity.

15. The device of claim 4, wherein the unique identity comprises a network address.

16. The device of claim 4, wherein generating the unique identity comprises applying a predefined bit mask to the seed identity.

17. The device of claim 4, wherein generating the unique identity comprises adding a predefined offset to the seed identity.

18. The device of claim 4, wherein generating the unique identity comprises generating the unique identity by a first method if a first condition exists and generating the unique identity by a second method if a second condition exists.

19. A method comprising:
    receiving, at a secure identity device, a data transmission comprising recipient identity data;
    determining an addressing scheme used to direct the data transmission;
    retrieving a seed identity from a secure memory;
    generating, at the secure identity device, a unique identity based on the seed identity and the determined addressing scheme;

extracting the recipient identity data from the received data transmission; and determining whether the generated unique identity corresponds to the recipient identity data.

20. The method of claim 19, wherein the unique identity comprises a first unique identity, the method further comprising:

generating, at the secure identity device, a second unique identity based on the seed identity, wherein the second unique identity is different from the first unique identity.

21. The method of claim 19, wherein the secure memory comprises a first secure memory, the method further comprising:

storing the unique identity in a second secure memory of the secure identity device, wherein the second secure memory is different from the first secure memory.

22. The method of claim 19, further comprising:

storing the seed identity in a secure identity card having the secure memory; and receiving the secure identity card in a physical interface of the secure identity device.

23. A method comprising:

receiving, at a secure device, identity data;

obtaining, from a secure memory area of the secure device, a unique identity for the secure device, wherein the unique identity is based on a seed identity stored in the secure device, predefined logic stored in the secure device, and an addressing scheme used to direct the identity data;

determining, at the secure device, whether the unique identity corresponds to the identity data;

if the unique identity does not correspond to the identity data, discarding the identity data; and if the unique identity corresponds to the identity data, using data from the identity data.

24. The method of claim 23, wherein obtaining the unique identity comprises:

in response to receiving the identity data, generating, at a transformation engine of the secure device, the unique identity based on the seed identity, the predefined logic, and the addressing scheme.

25. The method of claim 24, wherein:

obtaining the unique identity comprises:

determining, at the secure device and based on the identity data, the addressing scheme used to direct the identity data; and receiving, at the transformation engine of the secure device, the determined addressing scheme; and generating the unique identity comprises generating the unique identity in compliance with the determined addressing scheme.

26. The method of claim 23, further comprising:

generating a first unique identity and a second unique identity based on the seed identity and the predefined logic, the first unique identity being compliant with a first addressing scheme and the second unique identity being compliant with a second addressing scheme different from the first addressing scheme, wherein obtaining the unique identity comprises:

determining, at the secure device, the addressing scheme used to direct the identity data; and in response to determining the addressing scheme, selecting, as the unique identity for the secure device, one of the first unique identity and the second unique identity that is compliant with the addressing scheme.

27. A system comprising:

a first device comprising:

a first microprocessor;

first predefined logic; and first memory storing computer-readable instructions that, when executed by the first microprocessor, cause the first device to:

receive a data transmission comprising recipient identity data;

determine an addressing scheme used to direct the data transmission;

retrieve a first seed identity comprising an identification code;

generate a unique identity based on the first seed identity and the determined addressing scheme;

extract the recipient identity data from the received data transmission; and determine whether the generated unique identity corresponds to the recipient identity data;

a second device comprising:

a second microprocessor; and second memory storing computer-readable instructions that, when executed by the second microprocessor, cause the second device to:

store a second seed identity and a second predefined logic, wherein the second seed identity is different from the first seed identity, and wherein the second predefined logic is the same as the first predefined logic.

28. A system comprising:

a first device comprising:

a first microprocessor;

first predefined logic; and first memory storing computer-readable instructions that, when executed by the first microprocessor, cause the first device to:

receive a data transmission comprising recipient identity data;

determine an addressing scheme used to direct the data transmission;

retrieve a first seed identity comprising an identification code;

generate a unique identity based on the first seed identity and the determined addressing scheme;

extract the recipient identity data from the received data transmission; and determine whether the generated unique identity corresponds to the recipient identity data a second device comprising:

a second microprocessor; and second memory storing computer-readable instructions that, when executed by the second microprocessor, cause the second device to:

store a second seed identity and a second predefined logic, wherein the second seed identity is the same as the first seed identity, and wherein the second predefined logic is different from the first predefined logic.

* * * * *

UNITED STATES PATENT AND TRADEMARK OFFICE
CERTIFICATE OF CORRECTION

| | | |
|---|---|---|
| PATENT NO. | : 8,782,746 B2 | Page 1 of 1 |
| APPLICATION NO. | : 12/267838 | |
| DATED | : July 15, 2014 | |
| INVENTOR(S) | : Steven J. Reynolds | |

It is certified that error appears in the above-identified patent and that said Letters Patent is hereby corrected as shown below:

In the specification

Column 2, Discussion Of The Related Art, Line 53:
    Please delete "server" and insert --head-end--

In the claims

Column 11, Claim 3, Line 41:
    After "wherein", delete "¶"

Column 12, Claim 6, Line 3:
    After "card,", delete "¶"

Column 14, Claim 28, Line 50:
    After "data", insert --;--

Signed and Sealed this
Thirteenth Day of October, 2015

Michelle K. Lee
*Director of the United States Patent and Trademark Office*